INVENTOR
LLOYD L. SALISBURY, JR.

ATTORNEY

Jan. 28, 1969  L. L. SALISBURY, JR  3,423,765
PROSTHETIC DEVICE WITH ELECTRONIC PROPORTIONAL CONTROL GRASP
Filed Aug. 11, 1966

INVENTOR.
LLOYD L. SALISBURY, JR.
BY William G. Gapczynski
ATTORNEY

United States Patent Office 3,423,765
Patented Jan. 28, 1969

3,423,765
PROSTHETIC DEVICE WITH ELECTRONIC
PROPORTIONAL CONTROL GRASP
Lloyd L. Salisbury, Jr., Kensington, Md., assignor to the
United States of America as represented by the Secretary of the Army
Filed Aug. 11, 1966, Ser. No. 572,170
U.S. Cl. 3—1.1     8 Claims
Int. Cl. A61f 1/06

ABSTRACT OF THE DISCLOSURE

A prosthetic device including sensor means for providing a signal indicative of the slippage of an object from the grasp of the device and electrical and electronic means responsive to such signal for controlling the grasping action of the prosthetic device.

---

Figure 1:
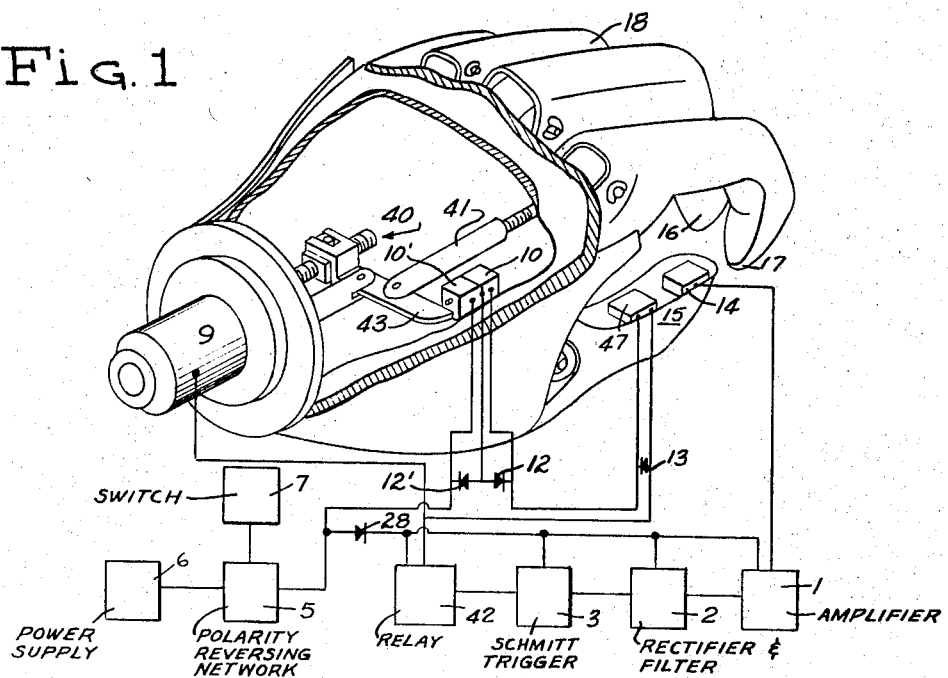

The invention described herein may be manufactured and used by or for the Government for governmental purposes without the payment to me of any royalty thereon.

This invention relates to a control mechanism for a prosthetic device. In order to satisfactorily perform its assigned function of providing artificial means of grasping, prosthetic devices in some way must feed back information which defines the extent to which the object grasped is slipping out of control of the prosthetic device.

In the case of harness-controlled upper-extremity prosthetic devices, the amputee receives force feedback information from his terminal device through his harness or through his stump socket. However, in externally powered devices this feedback information is unavailable to the amputee because the amputee is on the switching rather than the powered output end. It is essential therefore to provide means which inform the amputee of the extent to which the force applied by the prosthetic device is overgrasping or undergrasping. But the problem of directly informing the amputee of this condition is a long-standing one and has not been satisfactorily solved. Systems have been developed which provide a force or frequency feedback to areas of the body remote from the terminal device, but these systems have performed inadequately. This invention overcomes these disadvantages by providing means whereby the grasping function can be performed automatically without the requirement for feeding back to the amputee information relating to the extent of force applied to objects.

Accordingly, the object of this invention is to provide a prosthetic device which is sensitive to the slippage of the object grasped and which closes more tightly upon the object until the slippage stops.

Figure 2A:
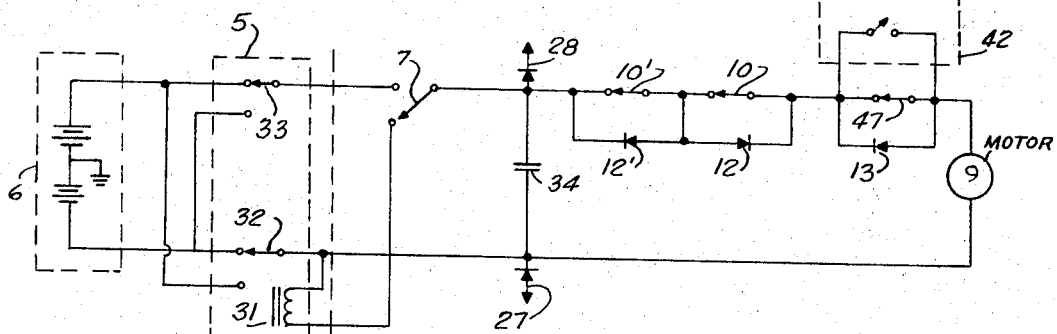
Figure 4:
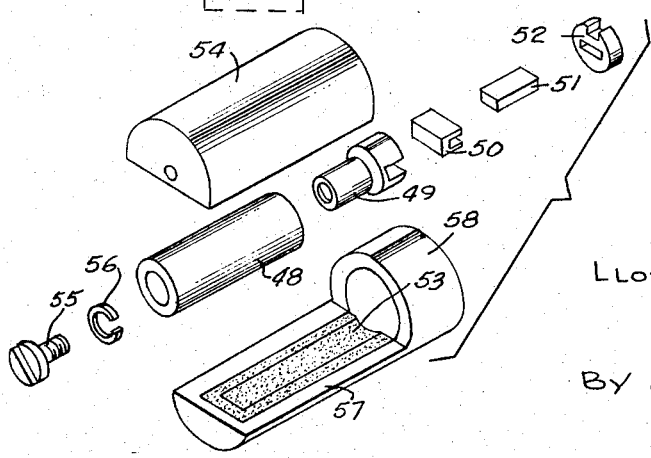
Figure 3A:
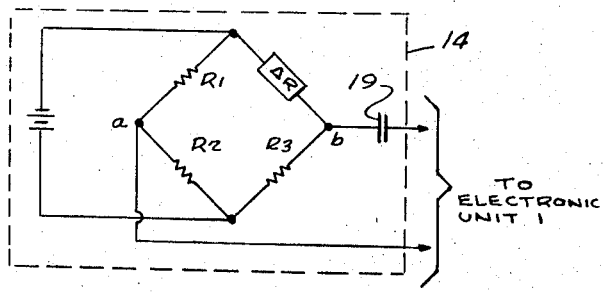

In operation, the invention involves the following sequence. The terminal device is guided to the object to be grasped and the amputee activates a switch which moves the fingers of the prosthetic device to grasp the object. If slippage occurs when the forearm is raised, a signal is sent to the terminal device closure activator and the terminal device would close just tight enough to prevent slippage. The activator automatically shuts off and the prosthetic device remains locked on the object. Activation of the initial switch would cause release of the object. These events are accomplished by the circuitry shown in the drawings in which:

FIG. 1 is a view of the prosthetic device and its associated circuitry necessary for performing the control function;

FIGS. 2A and B are detailed drawings of the control circuitry of FIG. 1;

FIGS. 3A, B and C show the circuitry required to provide alternate means of detecting slippage; and FIG. 4 is an exploded view of a construction for accommodating the piezo-electric crystal in the thumb of a prosthetic hand.

The system is applicable to a hand or hook or other grasping terminal device operated by external power. The mechanical to electrical transducer 14 shown in FIG. 1 can be a piezo-electric crystal, variable inductor as shown in FIG. 3C; variable capacitor, FIG. 3B; or variable resistor, FIG. 3A. The terminal device closure activator can be an electric motor, electromagnetic valve or other electrical to mechanical transducer. The following detailed sequence of operations uses a piezo-electric crystal, a hand-shaped terminal device and a D.C. motor. However, this is for purposes of illustration only and it is not intended as a limitation upon the scope of invention.

Figure 2B:
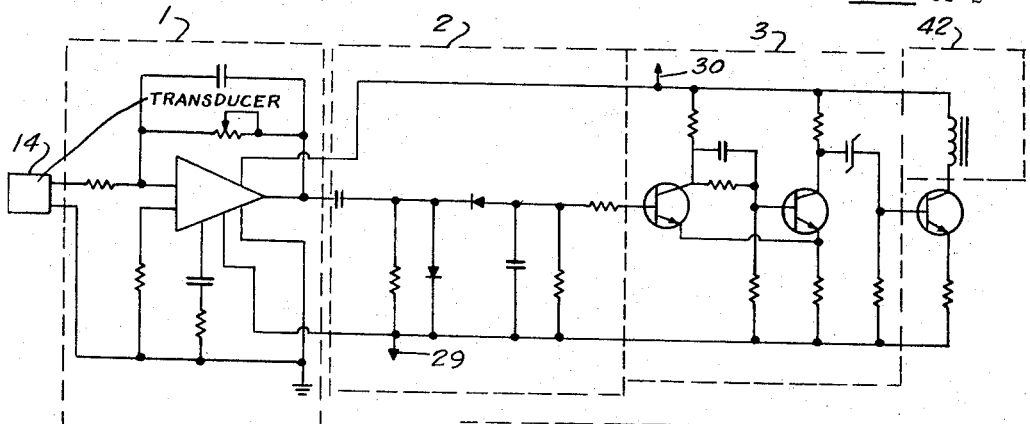

First, the switch 7 is momentarily depressed thereby applying voltage to capacitor 34 charging it whenever the system is energized. When switch 7 is released, the capacitor 34 discharges through the latching relay coil 31 causing it to change state, reversing the polarity of the output voltage by means of contacts 32 and 33 and producing the sequencing operation of opening and closing the hand. During the closing operation of the fingers the limit switch 10 is shorted by diode 12, in view of the voltage polarity, to permit operation of the motor 9. Switch 10' and diode 12' represent the limit switch for reversed polarity of voltage from that when the fingers are closing. The 12-volt power supply is connected to terminals 29 and 30 of FIG. 2B to energize the Schmitt trigger and relay 42.

The activation of motor 9 causes a worm gear 40 of FIG. 1 to engage linkage 41 which moves fingers 16, 17, and 18 toward the object to be grasped. When contact is made a pressure sensitive switch 47 is forced open thereby causing the motor to disengage. At this point if the object slips when lifted, a greater force to hold the object is necessary. This slippage against piezo-electric crystal 14 generates a voltage. The voltage is fed into an amplifier 1 of FIG. 2B. The output of amplifier 1 is rectified and filtered in unit 2 which produces a D.C. voltage. This D.C. voltage causes a Schmitt trigger 3 to change state, thereby energizing relay 42. The circuit to motor 9 being now complete, causes the energization of the motor which in turn tightens the grasp in the manner previously indicated. When the slippage ceases, the piezo-electric crystal 14 ceases to generate a voltage thereby permitting the Schmitt trigger to return to its original state. Relay 42 being now de-energized causes the motor 9 to stop.

If the amputee desires to release the object he merely depresses switch 7 momentarily. This reverses the voltage output from the polarity reversing network 5. Diodes 27 and 28 being no longer in a conducting state disable the rectifier and filter unit 2 and the Schmitt trigger 3. Diode 13, shorting switch 47, permits the reversed voltage to be applied to motor 9 which turns the worm gear 40 in a direction to open the fingers of the terminal device. This action continues until switch 10 mounted within the terminal device of FIG. 1 is tripped by lever 43 reaching its terminal point. The tripping of switch 10 de-energizes motor 9 thereby stopping all operations until switch 7 is again depressed to commence the sequence again.

FIGS. 3A, B and C show three alternatives to the piezo-electric crystal 14. FIG. 3A shows a variable resistance element ΔR mounted on a D.C. bridge with three fixed resistors $R_1$, $R_2$, and $R_3$. Resistors $R_1$, $R_2$, and $R_3$ are selected to produce zero voltage difference between points $a$ and $b$ when the variable resistance element ΔR is unstressed. When the element ΔR is mounted on the thumb 15 of FIG. 1 in such a way as to sense the erratic action of slippage, a noise voltage is generated and appears between points $a$ and $b$. This voltage is then passed by capacitor 19 to the input of electronic unit 1 and thus activates relay 42 and motor 9. Since capacitor 19 will only pass a changing voltage, a steady voltage difference due to a constant bridge unbalance as produced by a constant pinch force on ΔR, will not activate the electronic circuits of units 1, 2 and 3. Thus, when a condition of no slippage is realized then no fluctuating voltage is passed into amplifier 1. Accordingly, the motor 9 becomes idle until the reversing procedure previously described for the piezo-electric crystal is initiated.

Another embodiment of this invention uses a variable inductor to detect the slippage. In FIG. 3C a variable inductance element ΔX is mounted in an A.C. bridge with three fixed inductors $X_1$, $X_2$, and $X_3$. Inductors $X_1$, $X_2$, and $X_3$ are of such value to produce zero voltage difference between points $e$ and $f$ whenever ΔX is not stressed. When ΔX which is mounted on the thumb 15 of FIG. 1 senses slippage, an A.C. voltage with variable amplitude will appear between points $e$ and $f$. This voltage is amplified, rectified and filtered by units 67 and 68, respectively. The amplitude variations due to slippage vibrations will appear as variations around a D.C. level at the filter output. The variations will be passed by capacitor 19 to amplifier 1 of FIG. 2B, thereby activating motor 9.

Figure 3B:
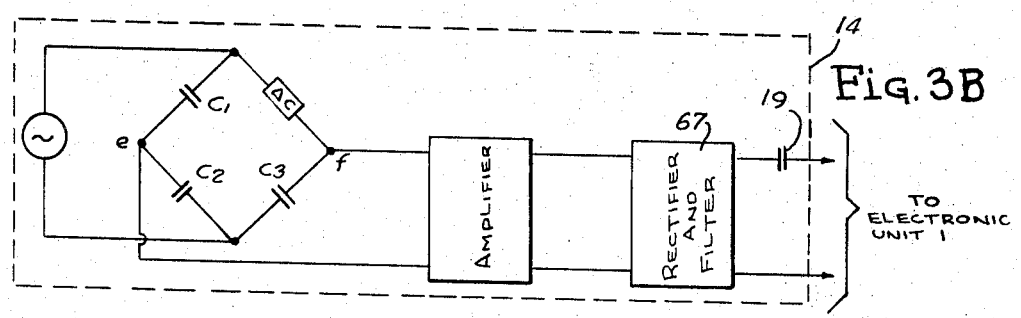
Figure 3C:
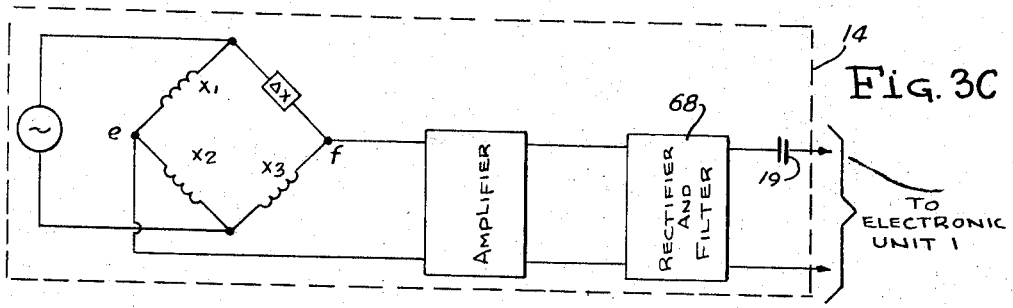

FIG. 3B shows the variable capacitor ΔC mounted in an A.C. bridge with three fixed capacitors $C_1$, $C_2$, and $C_3$. The operation is exactly as that for the variable inductor with ΔC substituted for ΔX.

For use with pneumatically-operated terminal devices, motor 9 is replaced with an electromagnetically-operated valve which controls air flow to piston-driven fingers 16 and 17.

It has been determined that the volar surface of the thumb is the most desirable location for the slippage detection mechanism, because of its use as an opposition post to the first and second finger during activation of the hand to achieve palmar prehension.

One construction in which the piezo-electric crystal sensor was used is shown in FIG. 4. In this embodiment a standard prosthetic hand was used in which the thumb, including a trough-like portion 57 terminated by a cylindrical portion 58 receives the crystal cartridge 48 having a cylindrical configuration, and its components, a torsion yoke 49, cushion 50, piezo-electric crystal 51 and the crystal mount 52. The cartridge is cemented to the foam liner 53 that is used to reduce the transmission of external vibration to the crystal 51, such as when using an electric shaver or electric toothbrush. An activator plate 54 is shaped to match the contours of the volar surface of the thumb and is fastened to the crystal cartridge 48 by means of a screw 55 and lock washer 56. The activator plate 54 has limited rotational movement of about 5 degrees. This movement applied a torsional force to the crystal 51. When initial contact force is applied during the grasp cycle and the object slips on lifting, the activator plate will signal the system through the crystal to apply additional force to assure firm grasp. It has been possible to detect slippage with and without a vinyl cosmetic glove. The presence of the glove, however, reduces the system sensitivity by about 20 db. This can be compensated for by an increase in the gain of the amplifier. Certain parameters which are not easily calculated because of the interdependence of the mechanical and electronic subsystems must be determined experimentally. For example, the gain and frequency response of the amplifier is determined by the vibration transducer used, the mechanical slippage transmission system, the surface to be grasped, the glove material and the mechanical noise from the motor and drive mechanism propagated to the transducer. The minimum increment of force is determined by the time constants of the filter and relay, the inertia of the motor and drive system and the hand closing speed.

I claim:
1. In combination with a prosthetic device having movable terminal members, control means comprising:
   (a) electromechanical drive means connected to the terminal members;
   (b) means for controlling the direction of rotation of said electromechanical drive means for selectively opening and closing the terminal members;
   (c) circuit interrupting means mounted in a terminal member selectively de-energizing said electromechanical drive means upon a predetermined degree of closure of the terminal members;
   (d) electronic means connected to said circuit interrupting means for regulating the operation thereof as determined by current flow to said electromechanical drive means;
   (e) transducer means mounted in a terminal member responsive to frictional pressure of objects grasped by the terminal members;
   (f) electronic circuit means electrically connected to said transducer and activated responsive to frictional pressure applied to said transducer by objects grasped by the terminal members to produce a proportional control of the grasp of the terminal members; and
   (g) electrical control means connected to the output of said electronic circuit means for controlling the operation of said electromechanical drive means responsive to predetermined frictional pressure applied to said transducer by objects grasped by the terminal members.

2. The combination recited in claim 1 wherein said electromechanical drive means comprises:
   (a) a reversible electric motor;
   (b) a lead screw coupled to said reversible electric motor;
   (c) linkage means interconnecting said lead screw and the terminal members;
   (d) switch means coacting with said linkage means for limiting the opening and closing of the terminal members; and
   (e) electronic means connected to said switch means for controlling the operation of said switch means as determined by current flow to said electromechanical drive means.

3. The combination recited in claim 1 wherein said means for selectively controlling the direction of rotation of said electromechanical drive means comprises:
   (a) an energizing source;
   (b) manually operated switch means; and
   (c) electromagnetically operated polarity reversing means interconnecting said energizing source and said manually operated switch means.

4. The combination recited in claim 1 wherein said transducer means comprises:
   (a) a piezo-electric crystal;
   (b) amplifier and rectifier and filter means successively connected to said piezo-electric crystal;
   (c) trigger circuit means connected to the output of said rectifier and filter means;
   (d) energizing means for said amplifier, rectifier and filter means and said trigger circuit means including electronic means connected in said energizing means for regulating the energization of said amplifier, rectifier and filter means and said trigger circuit means as determined by current flow to said electromechanical drive means; and
(e) electromagnetic control means for controlling the operation of said electromechanical drive means responsive to frictional pressure applied to said piezo-electric crystal by objects grasped by the terminal members.

5. The combination recited in claim 1 wherein said transducer means comprises:
   (a) a resistance bridge circuit including a variable resistor producing a variable noise voltage responsive to slippage of objects grasped by the terminal members;
   (b) a unidirectional source of potential connected to said resistance bridge circuit;
   (c) a capacitor connected to the output of said resistance bridge responsive to the variable noise voltage output of said resistance bridge, the output of said capacitor being connected to said electronic circuit means to activate said electromechanical drive means for activation of the terminal members until a constant grasp is exerted on an object by the terminal members.

6. The combination recited in claim 1 wherein said transducer means comprises:
   (a) a capacitor bridge circuit including a variable capacitor producing a varying voltage responsive to slippage of objects grasped by the terminal members;
   (b) an alternating voltage source connected to said capacitor bridge circuit;
   (c) an amplifier, rectifier and filter circuit means and a capacitor connected to the output thereof; the output of said capacitor connected to said electronic circuit means for activation of said electromechanical drive means for operation of the terminal members until a constant grasp is exerted on an object by the terminal members.

7. The combination recited in claim 1 wherein said transducer comprises:
   (a) an inductance bridge circuit including a variable inductance producing a voltage of varying amplitude responsive to slippage of objects grasped by the terminal members;
   (b) an alternating voltage source connected to said inductance bridge circuit; and
   (c) an amplifier, rectifier and filter circuit means and a capacitor connected to the output thereof, the output of said capacitor connected to said electronic circuit means for activation of said electromechanical drive means for operation of the terminal members until a constant grasp is exerted on an object by the terminal members.

8. The combination as recited in claim 1 wherein said transducer means further comprises:
   (a) an elongated trough-like member terminated at one end by a cylindrical portion;
   (b) said trough-like member lined with a resilient material;
   (c) a cylindrical member received in said resiliently lined trough-like member;
   (d) a torsion member including a tubular portion terminating in a bifurcated head, the tubular portion being of smaller outside diameter than the internal diameter of said cylindrical member and received therein;
   (e) a U-shaped member received within the bifurcated head of said torsion member;
   (f) a disc-like member having an elongated slot therein and a peripheral keyway;
   (g) a piezo-electric crystal one end of which is received in said U-shaped member and the opposite end thereof is received in said elongated slot;
   (h) an elongated semi-circular member coacting with said trough-like member to form a complete cylinder corresponding in dimension with said cylindrical portion and enclosing said cylindrical member, torsion member, U-shaped member, disc-like member, and said piezo-electric member whereby frictional forces exerted upon said elongated semi-circular member is transmitted to said torsion member and said piezo-electric crystal to produce electrical impulses; and
   (i) fastening means for securing said elongated semi-circular member to said elongated trough-like member.

References Cited

FOREIGN PATENTS 1,007,469  5/1957  Germany.
163,718  1/1965  Russia.
166,099  5/1965  Russia.

OTHER REFERENCES

"Electronics in Prosthetics," Proceedings of the IRE, September 1962, p. 2005.

"An Artificial Hand Controlled by the Nerves" by A. H. Bottomley, New Scientist, vol. 21, No. 382, Mar. 12, 1964, pp. 668–671.

RICHARD A. GAUDET, *Primary Examiner.*

RONALD L. FRINKS, *Assistant Examiner.*

U.S. Cl. X.R.

3—1.2, 12.7